(12) United States Patent
Chen et al.

(10) Patent No.: US 8,129,074 B2
(45) Date of Patent: Mar. 6, 2012

(54) CROSSLINKED NANO-INORGANIC PARTICLE/POLYMER ELECTROLYTE MEMBRANE FOR MEMBRANE ELECTRODE ASSEMBLY

(75) Inventors: Jinhua Chen, Takasaki (JP); Masaru Yoshida, Takasaki (JP); Masaharu Asano, Takasaki (JP); Tetsuya Yamaki, Takasaki (JP); Toshimitsu Tachibana, Ibaraki (JP); Soji Nishiyama, Ibaraki (JP); Yozo Nagai, Ibaraki (JP)

(73) Assignees: Japan Atomic Energy Agency, Ibaraki (JP); Nitto Denko Corporation, Ibaraki (JP)

( * ) Notice: Subject to any disclaimer, the term of this patent is extended or adjusted under 35 U.S.C. 154(b) by 1070 days.

(21) Appl. No.: 11/600,279

(22) Filed: Nov. 16, 2006

(65) Prior Publication Data

US 2007/0207359 A1 Sep. 6, 2007

(30) Foreign Application Priority Data

Nov. 17, 2005 (JP) ................................. 2005/332521

(51) Int. Cl.
*H01M 8/02* (2006.01)
*H01M 8/10* (2006.01)
*H01G 9/022* (2006.01)
(52) U.S. Cl. ........................ 429/494; 429/493; 252/62.2
(58) Field of Classification Search .................. None
See application file for complete search history.

(56) References Cited

U.S. PATENT DOCUMENTS 5,001,023 A * 3/1991 Cheshire et al. ................ 429/94
2006/0223895 A1 10/2006 Yoshida et al.

FOREIGN PATENT DOCUMENTS

| JP | 6-111827 | | 4/1994 |
|---|---|---|---|
| JP | 6-111834 | | 4/1994 |
| JP | 06111834 | A * | 4/1994 |
| JP | 9-251857 | | 9/1997 |
| JP | 2002-528867 | | 9/2002 |
| JP | 2002-352818 | | 12/2002 |
| JP | 2002352818 | A * | 12/2002 |
| JP | 2003-82129 | | 3/2003 |
| JP | 2003-261697 | | 9/2003 |
| JP | 2003-308855 | | 10/2003 |
| JP | 2003308855 | A * | 10/2003 |
| JP | 2004-14436 | | 1/2004 |
| JP | 2004-51685 | | 2/2004 |
| JP | 2004-59752 | | 2/2004 |
| JP | 2004-158270 | | 6/2004 |
| JP | 2004-172124 | | 6/2004 |
| JP | 2004-300360 | | 10/2004 |
| JP | 1005-56787 | | 3/2005 |
| JP | 2005-63778 | | 3/2005 |
| JP | 2005063778 | A * | 3/2005 |
| JP | 2006-282969 | | 10/2006 |
| WO | WO 00/24074 | | 4/2000 |

* cited by examiner

*Primary Examiner* — Keith Walker

(57) ABSTRACT

A crosslinked nano-inorganic particle/polymer electrolyte membrane composed of a polymer film substrate, graft molecular chains bound to the backbone skeleton of the polymer film substrate and comprising a vinyl monomer graft-polymerized, sulfonic groups bound to the graft molecular chains, and an inorganic material as nano-scale particles uniformly dispersed within a crosslinked structure ascribed to the backbone skeleton of the polymer film substrate and the graft molecular chains, wherein the backbone skeleton of the polymer film substrate, the graft molecular chains, and the nano-inorganic particles mutually construct a crosslinked structure.

3 Claims, No Drawings

CROSSLINKED NANO-INORGANIC PARTICLE/POLYMER ELECTROLYTE MEMBRANE FOR MEMBRANE ELECTRODE ASSEMBLY

BACKGROUND OF THE INVENTION

1. Field of the Invention

This invention relates to a crosslinked nano-inorganic particle/polymer electrolyte membrane suitable for use in a fuel cell, and a method for producing it. The crosslinked nano-inorganic particle/polymer electrolyte membrane of the present invention is excellent in oxidation resistance, heat resistance, and dimensional stability, and has excellent proton conductivity. The present invention also relates to a membrane electrode assembly using the crosslinked nano-inorganic particle/polymer electrolyte membrane.

2. Description of the Related Art

A fuel cell using a polymer electrolyte membrane can be operated at a temperature in the vicinity of 80° C. and, because of its high energy density, is expected to serve as a power source for mobile instruments, home-oriented cogeneration, and automobiles, or as a simplified auxiliary power source, by use of a fuel such as methanol or hydrogen. Development of a polymer electrolyte membrane having excellent characteristics in the fuel cell is one of the most important technologies.

The polymer electrolyte membrane fuel cell is composed of a cell stack consisting of single cells stacked in many layers, each single cell as a power generation unit having a pair of electrode catalyst layers provided on both surfaces of an electrolyte membrane. In this case, the electrolyte membrane acts to conduct protons, and also acts as a diaphragm for preventing direct mixing of hydrogen or methanol as a fuel, and air (oxygen) as an oxidizing agent. The electrolyte membrane is desired to have a great ion exchange capacity; chemical stability of the membrane for long-term passage of an electric current, especially, resistance to hydroxide radicals becoming a main cause of membrane deterioration (i.e., oxidation resistance); constant and high water retention properties of the membrane for keeping electrical resistance low; and excellent heat resistance at the cell operating temperature of 80° C., or at even higher temperatures from the viewpoints of increasing the activity of the electrode catalyst and effective utilization of waste heat. To act as the diaphragm, the electrolyte membrane is required to be excellent in the dynamic strength and dimensional stability of the membrane, and not to have excessive permeability to a hydrogen gas, methanol or an oxygen gas.

The polymer electrolyte membrane fuel cell in the early days used a hydrocarbon-based polymer electrolyte membrane produced by the copolymerization of styrene and divinylbenzene. However, this electrolyte membrane had very poor durability due to low oxidation resistance, and was thus scarcely practical. Thereafter, the perfluorosulfonic acid membrane "Nafion (registered trademark)" developed by DuPont was generally used.

The, conventional fluoropolymer electrolyte membranes, such as Nafion, were excellent in chemical durability and stability. However, their ion exchange capacity was as low as about 1 meq/g, and their water retention properties were so insufficient that the drying of the ion exchange membranes occurred at the low relative humidity, resulting in decreased proton conductivity. They were also disadvantageous in that when methanol was used as a fuel, swelling of the membrane or crossover of methanol took place. If it was attempted to introduce many sulfonic groups into the membrane in order to increase the ion exchange capacity, the strength of the membrane markedly decreased because of swelling, since no crosslinked structure was present in the polymer chains, with the result that the membrane was easily damaged. With the conventional fluoropolymer electrolyte membrane, therefore, it was necessary to limit the content of the sulfonic groups to about 1 meq/g at which the strength of the membrane was maintained.

Furthermore, the monomer for the fluoropolymer electrolyte membrane such as Nafion is difficult and complicated to synthesize, and a process for polymerizing it to produce the polymer membrane is also complicated. Thus, the resulting product is very expensive, constituting a serious impediment to the installation of a proton exchange membrane fuel cell in automobiles for practical use. Efforts have thus been made to develop a low-cost high-performance electrolyte membrane which can replace Nafion, etc.

In the field of radiation graft polymerization which is closely related to the present invention, on the other hand, attempts have been made to graft-polymerize a monomer, which can introduce sulfonic groups, into a polymer membrane, thereby producing a solid polymer electrolyte membrane. The inventors have conducted studies in an attempt to develop a new solid polymer electrolyte membrane, and have obtained the following findings: A styrene monomer is introduced by a radiation graft reaction into a polytetrafluoroethylene film having a crosslinked structure, and is then sulfonated. As a result, the ion exchange capacity can be controlled in a wide range and, since the crosslinks are imparted, the resulting product is minimally swollen with a methanol fuel. The inventors have developed a solid polymer electrolyte membrane characterized by these findings, and a method for producing the membrane (see Japanese Unexamined Patent Publication No. 2001-348439). However, this polymer electrolyte membrane has styrene graft chains composed of hydrocarbons, and thus had the disadvantages that when the fuel cell was operated for a long time, oxidation occurred in some of the graft chain portions, leading to a decline in the ion exchange capacity of the membrane.

The inventors also developed a functional inorganic-graft polymer hybrid ion exchange membrane, and a method for its preparation (see Japanese Unexamined Patent Publication No. 2005-108561). The membrane and the method are characterized in that an inorganic fine powder is mixed with an ethylene-tetrafluoroethylene copolymer, followed by proceeding into a film, to form an inorganic dispersed film, graft polymer chains are introduced into the film, whereafter a crosslinked structure is imparted by radiation and sulfonated. However, the hybrid ion exchange membrane has been found to involve problems, such that the inorganic powder is apt to agglomerate, requiring uniform dispersion and mixing.

The present invention has been accomplished to solve the above-described problems with the earlier technologies. This invention concerns a polymer solid electrolyte which is intended for resolving the drawbacks of polymer ion exchange membranes, including low ion exchange capacity, poor dimensional stability of the membrane, and low oxidation resistance, and the problem, in particular, that the most important inorganic fine powder is liable to agglomeration, thus causing biased presence of the lumpy inorganic material in the membrane, resulting in insufficient strength of the electrolyte membrane produced.

It is an object of the present invention to provide a crosslinked nano-inorganic particle/polymer electrolyte membrane suitable for use in a fuel cell, and excellent in ion exchange capacity, dimensional stability and oxidation resistance, as well as strength, and a method for producing the polymer electrolyte membrane. It is another object of the invention to provide a membrane electrode assembly using such a crosslinked nano-inorganic particle/polymer electrolyte membrane.

SUMMARY OF THE INVENTION

A first aspect of the present invention is a crosslinked nano-inorganic particle/polymer electrolyte membrane. The crosslinked nano-inorganic particle/polymer electrolyte membrane of the invention is a crosslinked nano-inorganic particle/polymer electrolyte membrane composed of a polymer film substrate; graft molecular chains bound to the backbone skeleton of the polymer film substrate and comprising a vinyl monomer graft-polymerized; sulfonic groups bound to the graft molecular chains; and an inorganic material as nano-scale particles uniformly dispersed within a crosslinked structure ascribed to the backbone skeleton of the polymer film substrate and the graft molecular chains, and wherein the backbone skeleton of the polymer film substrate, the graft molecular chains, and the nano-inorganic particles mutually construct a crosslinked structure.

In the crosslinked nano-inorganic particle/polymer electrolyte membrane, the polymer film substrate is preferably a fluorocarbon-based polymer film substrate, a fluorocarbon-hydrocarbon-based polymer film substrate, or a hydrocarbon-based polymer film substrate.

A second aspect of the present invention is a method for producing a crosslinked nano-inorganic particle/polymer electrolyte membrane. The method for producing the crosslinked nano-inorganic particle/polymer electrolyte membrane according to the present invention comprises: a first ionizing radiation irradiation step of irradiating a polymer film substrate with ionizing radiation to generate radicals, which serve as starting points for graft polymerization, in the backbone skeleton of the polymer film substrate; a graft polymerization step of immersing the polymer film substrate in a solution containing a vinyl monomer and a sol precursor, and graft-polymerizing the vinyl monomer with the polymer film substrate; a sulfonation step of introducing sulfonic groups into graft chains formed in the graft polymerization step; and a hydrolysis/heat treatment step of hydrolyzing and heat-treating the sol precursor to form nano-inorganic particles.

In the method for producing the crosslinked nano-inorganic particle/polymer electrolyte membrane according to the present invention, a second ionizing radiation irradiation step of irradiating the polymer film substrate with ionizing radiation to mutually crosslink the backbone skeleton of the polymer film substrate, the graft chains, and the sol precursor may be incorporated after the hydrolysis/heat treatment step.

In the method for producing the crosslinked nano-inorganic particle/polymer electrolyte membrane according to the present invention, the hydrolysis/heat treatment step may be performed after the graft polymerization step, then the second ionizing radiation irradiation step may be performed, and the sulfonation step may be further performed.

In the method for producing the crosslinked nano-inorganic particle/polymer electrolyte membrane according to the present invention, the second ionizing radiation irradiation step may be performed after the sulfonation step, and then the hydrolysis/heat treatment step may be performed.

In the method for producing the crosslinked nano-inorganic particle/polymer electrolyte membrane according to the present invention, graft polymerization, hydrolysis/heat treatment, and mutual crosslinking of the backbone skeleton of the polymer film substrate, the graft chains, and the sol precursor may be performed simultaneously with ionizing radiation in the first ionizing irradiation step, and then the sulfonation step may be performed.

In the method for producing the crosslinked nano-inorganic particle/polymer electrolyte membrane according to the present invention, the polymer film substrate may be a fluorocarbon-based polymer film substrate, a fluorocarbon-hydrocarbon-based polymer film substrate, or a hydrocarbon-based polymer film substrate.

In the method for producing the crosslinked nano-inorganic particle/polymer electrolyte membrane according to the present invention, the vinyl monomer is preferably a member or a mixture of two or more members selected from the group consisting of a monofunctional vinyl monomer, a multifunctional vinyl monomer, and a sulfonylvinyl monomer.

A third aspect of the present invention is a membrane electrode assembly. The membrane electrode assembly of the present invention is composed of the crosslinked nano-inorganic particle/polymer electrolyte membrane according to the first aspect of the present invention, an anode electrode, and a cathode electrode.

According to the present invention, there is provided a crosslinked nano-inorganic particle/polymer electrolyte membrane suitable for use in a fuel cell, and excellent in proton conductivity, dimensional stability and oxidation resistance, as well as strength, and a method for producing the polymer electrolyte membrane. According to the present invention, there is also provided a membrane electrode assembly using such a crosslinked nano-inorganic particle/polymer electrolyte membrane.

DETAILED DESCRIPTION OF THE INVENTION

Preferred embodiments of the crosslinked nano-inorganic particle/polymer electrolyte membrane, the method for producing the polymer electrolyte membrane, and the membrane electrode assembly using the polymer electrolyte membrane, according to the present invention, will now be described in detail.

The preferred embodiments of the crosslinked nano-inorganic particle/polymer electrolyte membrane according to the present invention will be described first.

The crosslinked nano-inorganic particle/polymer electrolyte membrane of the present invention is composed of a polymer film substrate; graft molecular chains bound to the backbone skeleton of the polymer film substrate and comprising a vinyl monomer graft-polymerized; sulfonic groups bound to the graft molecular chains; and an inorganic material as nano-scale particles uniformly dispersed within a crosslinked structure ascribed to the backbone skeleton of the polymer film substrate and the graft molecular chains, and wherein the backbone skeleton of the polymer film substrate, the graft molecular chains, and the nano-inorganic particles mutually construct a crosslinked structure.

The term "polymer film substrate", as used herein, refers to a polymer material in the form of a film which serves as a base material or substrate for an electrolyte membrane. The polymer film substrate usable in the present invention is not limited, as long as it is one which can impart a crosslinked structure upon irradiation with ionizing radiation. For example, there can be used films composed of polyvinylidene fluoride, ethylene-tetrafluoroethylene copolymer, polychlorotrifluoroethylene, fluorinated ethylene-propylene copolymer, tetrafluoroethylene-perfluoroalkylvinyl ether copolymer, polyvinyl fluoride, polytetrafluoroethylene, polyethylene, polypropylene, polyethylene terephthalate, polyimide, and acrylonitrile-butadiene-styrene copolymer.

In the present invention, the vinyl monomer graft-polymerized with the polymer film substrate can be one member or a mixture of two or more members selected from the group consisting of monofunctional vinyl monomers in group A, multifunctional vinyl monomers in group B, and sulfonylvinyl monomers in group C which will be exemplified below.

Group A:

A monofunctional vinyl monomer selected from the group consisting of styrene; alkylstyrenes such as methylstyrenes (α-methylstyrene, vinyltoluene, etc.), ethylstyrenes, dimethylstyrenes, trimethylstyrenes, pentamethylstyrenes, diethylstyrenes, isopropylstyrenes, and butylstyrenes (3-tert-butylstyrene, 4-tert-butylstyrene, etc.); halogenated styrenes such as chlorostyrenes, dichlorostyrenes, trichlorostyrenes, bromostyrenes (2-bromostyrene, 3-bromostyrene, 4-bromostyrene, etc.), and fluorostyrenes (2-fluorostyrene, 3-fluorostyrene, 4-fluorostyrene); alkoxystyrenes such as methoxystyrenes, methoxymethylstyrenes, dimethoxystyrenes, ethoxystyrenes, and vinylphenylallyl ethers; hydroxystyrene derivatives such as hydroxystyrenes, methoxyhydroxystyrenes, acetoxystyrenes, and vinylbenzylalkyl ethers; carboxystyrene derivatives such as vinylbenzoic acids, and formylstyrenes; nitrostyrene derivatives such as nitrostyrenes; aminostyrene derivatives such as aminostyrenes, and dimethylaminostyrenes; and sulfur-containing styrene derivatives such as vinylbenzylsulfonic acids, and styrenesulfonyl fluorides.

Group B:

A multifunctional vinyl monomer selected from the group consisting of bis(vinylphenyl)ethane, divinylbenzene, 2,4,6-triallyloxy-1,3,5-triazine (triallyl cyanurate), triallyl-1,2,4-benzene tricarboxylate (triallyl trimellitate), diallyl ether, triallyl-1,3,5-triazine-2,4,6-(1H,3H,5H)-trione, 2,3-diphenylbutadiene, 1,4-diphenyl-1,3-butadiene, 1,4-divinyloctafluorobutane, bis(vinylphenyl)methane, divinylacetylene, divinyl sulfide, divinyl sulfone, divinyl ether, divinyl sulfoxide, isoprene, 1,5-hexadiene, butadiene, and 1,4-divinyl-2,3,5,6-tetrachlorobenzene.

Group C:

A sulfonylvinyl monomer selected from the group consisting of $CF_2=CF(SO_2X^1)$ (where $X^1$ is a halogen group, and —F or —Cl), $CH_2=CF(SO_2X^1)$ (where $X^1$ is a halogen group, and —F or —Cl), $CF_2=CF(O(CF_2)_{1-4}SO_2X^1)$ (where $X^1$ is a halogen group, and —F or —Cl), $CF_2=CF(OCH_2(CF_2)_{1-4}SO_2X^1)$ (where $X^1$ is a halogen group, and —F or —Cl), $CF_2=CF(SO_2R^1)$ (where $R^1$ is an alkyl group, and —$CH_3$, —$C_2H_5$, or —$C(CH_3)_3$), $CH_2=CF(SO_2R^1)$ (where $R^1$ is an alkyl group, and —$CH_3$, —$C_2H_5$, or —$C(CH_3)_3$), and $CF_2=CF(OCH_2(CF_2)_{1-4}SO_2X^1)$ (where $X^1$ is an alkyl group, and —$CH_3$, —$C_2H_5$, or —$C(CH_3)_3$).

Mainly, the monofunctional vinyl monomer in the group A enables sulfonic groups to be introduced into the resulting graft chains by the sulfonation step, the multifunctional vinyl monomer in the group B enables the resulting graft chains to be chemically crosslinked to each other, and the sulfonylvinyl monomer in the group C enables sulfonic groups to be introduced by the formation of the graft chains.

In the present invention, the sulfonic groups to be bound to the graft molecular chains may be in such an amount that the ion exchange capacity of the polymer electrolyte membrane of the present invention becomes 0.3 to 4.0 meq/g. The term "ion exchange capacity", as used herein, refers to the amount of ion exchange groups per gram weight (meq/g) of the electrolyte membrane on a dry basis.

The term "nano-inorganic particles", as used herein, is taken to mean the inorganic material in a particulate form on a nano-scale. The representative diameter of the nano-inorganic particles is 5 to 70 nm, preferably 10 to 30 nm. The size of the nano-inorganic particles can be controlled, as appropriate, by modifying the hydrolysis conditions, the heat treatment conditions, etc. during the production of the polymer electrolyte membrane. In the present invention, the nano-inorganic particles are not limited, if they are those which can be existent stably within the crosslinked structure of the polymer electrolyte membrane produced in the present invention (namely, the crosslinked structure attributed to the backbone skeleton of the polymer film substrate and the graft molecular chains). The preferred examples of the nano-inorganic particles in the present invention are $Al_2O_3$, $Y_2O_3$, $SiO_2$, $TiO_2$, $ZrO_2$, $WO_3$, and $NiO$. The nano-inorganic particles can be introduced into the polymer electrolyte membrane of the present invention, for example, with the sol precursor in group D shown below being used as the raw material:

Group D:

A sol precursor such as aluminum methoxide $Al(OCH_3)_3$, aluminum ethoxide $Al(OC_2H_5)_3$, aluminum isopropoxide $Al(i-OC_3H_7)_3$, aluminum butoxide $Al(OC_4H_9)_3$, yttrium butoxide $Y(OC_4H_9)_3$, tetramethoxysilane $Si(OCH_3)_4$, tetraethoxysilane $Si(OC_2H_5)_4$, tetraisopropoxysilane $Si(i-OC_3H_7)_4$, tetra-tert-butoxysilane $Si(t-OC_4H_9)_4$, monophenyltrimethoxysilane $C_6H_5—Si(OCH_3)_3$, monophenyltriethoxysilane $C_6H_5—Si(OC_2H_5)_3$, 1,4-bistrimethoxysilylbenzene $(CH_3O)_3Si—C_6H_4—Si(OCH_3)_3$, 1,4-bistriethoxysilylbenzene $(C_2H_5O)_3Si—C_6H_4—Si(OC_2H_5)_3$, titanium methoxide $Ti(OCH_3)_4$, titanium ethoxide $Ti(OC_2H_5)_4$, titanium isopropoxide $Ti(i-OC_3H_7)_4$, titanium butoxide $Ti(OC_4H_9)_4$, zirconium methoxide $Zr(OCH_3)_4$, zirconium ethoxide $Zr(OC_2H_5)_4$, zirconium propoxide $Zr(OC_3H_7)_4$, zirconium butoxide $Zr(OC_4H_9)_4$, tungsten ethoxide $W(OC_2H_5)_6$, nickel nitrate $N_i(NO_3)_2·6H_2O$, zirconium oxychloride $ZrOCl_2$, aluminum oxychloride $AlOCl$, or titanium tetrachloride $TiCl_4$.

The sol precursor such as the one shown in the group D is hydrolyzed and heat-treated, whereby it can be converted into the nano-inorganic particles. As the sol precursor, one member or a mixture of two or more members of the group D can be used. If tetramethoxysilane $Si(OCH_3)_4$ is used as the sol precursor, for example, liquid $Si(OCH_3)_4$ is hydrolyzed to form $Si(OH)_4$, which is heat-treated, whereby $SiO_2$ nano-inorganic particles can be formed.

The crosslinked nano-inorganic particle/polymer electrolyte membrane of the present invention can be changed in ion exchange capacity by controlling the degree of grafting (DOG) (see the equation (1) of the Examples) or the sulfonation level, i.e., the amount of the sulfonic groups bound to the graft chains. That is, the ion exchange capacity is increased, if the DOG is raised to introduce a larger amount of the ion exchange groups. If the amount of the ion exchange groups is too large, however, the disadvantage arises that the membrane swells during incorporation of water to lower the strength of the membrane. The DOG depends on the type of the monomer necessary for introduction of the graft chains, but when the DOG is not more than 10%, the ion exchange capacity is as low as 0.8 meq/g or less. At a DOG of 150% or higher, on the other hand, swelling of the membrane is great. Thus, the DOG in the present invention is preferably 10 to 150%, more preferably 16 to 120%, based on the polymer film substrate. The ion exchange capacity is preferably 0.3 to 4.0 meq/g, more preferably 0.5 to 2.5 meq/g. The crosslinked nano-inorganic particle/polymer electrolyte membrane of the present invention, which has the above-mentioned properties, is characterized by the ability to control the characteristics of the ion exchange capacity within a wide range appropriate for use in a fuel cell, high proton conductivity, high dimensional stability of the membrane, and, particularly, excellent oxidation resistance ascribed to the possession of a structure involving mutual crosslinking of the backbone skeleton of the polymer film substrate, the graft chains, and the nano-inorganic particles.

Moreover, the crosslinked nano-inorganic particle/polymer electrolyte membrane of the present invention can control water content by the selection of the graft substrate, the amount of the sulfonic groups introduced, the molecular structure of the graft monomer, and the water retention capability of the nano-inorganic particles. When the electrolyte membrane is used as a fuel cell electrolyte membrane, too low a water content is not preferred, because slight changes in the operating conditions lead to a change in proton conductivity or gas permeability coefficient. Nafion (registered trademark), which has been used so far, has most of its molecular chains composed of [—$CF_2$—], and lacks a crosslinked structure. Thus, when the cell using Nafion was operated at a high temperature of 80° C. or above, the disadvantage occurred that the membrane excessively absorbed water and swelled, resulting in a rapidly decreased mechanical property.

The crosslinked nano-inorganic particle/polymer electrolyte membrane of the present invention, by contrast, has a structure in which the backbone skeleton of the polymer film substrate, the graft molecular chains, and the nano-inorganic particles are mutually crosslinked. Thus, the water content can be controlled in the range of 10 to 100% by weight, although it is mainly dependent on the amount of the sulfonic groups. Generally, as the ion exchange capacity increases, the water content also increases. The water content of the polymer electrolyte membrane of the present invention is preferably 5 to 100% by weight, more preferably 10 to 80% by weight.

The polymer electrolyte membrane has lower proton resistance, and its performance as an electrolyte membrane is better, as its proton conductivity related to ion exchange capacity increases. If the proton conductivity of the ion exchange membrane at 25° C. is 0.02 $[\Omega \cdot cm]^{-1}$ or less, the output performance of the fuel cell often declines markedly. Thus, it is a frequent practice to design the proton conductivity of a polymer electrolyte membrane to be 0.02 $[\Omega \cdot cm]^{-1}$ or more, or 0.10 $[\Omega \cdot cm]^{-1}$ or more for a polymer electrolyte membrane having higher performance. On the other hand, the crosslinked nano-inorganic particle/polymer electrolyte membrane of the present invention has a value of proton conductivity at 25° C. which is equal to or higher than that of the Nafion (registered trademark) membrane. This may be because the backbone skeleton of the polymer film substrate, the graft molecular chains, and the nano-inorganic particles have a mutually crosslinked structure, so that swelling of the membrane with water is suppressed, thereby facilitating the interaction between the adjacent sulfonic groups, and rendering the conduction of ions relatively high.

With the fuel cell, methanol is currently considered as one of candidates for fuel. However, Nafion (registered trademark), which is a perfluorosulfonic acid membrane, has no crosslinked structure among molecular chains. Thus, this membrane swells greatly with methanol, and crossover of fuel occurs in which the methanol as fuel diffuses from the anode (fuel electrode) to the cathode (air electrode) through the cell membrane, posing a serious problem of a decrease in power generation efficiency. The crosslinked nano-inorganic particle/polymer electrolyte membrane of the present invention, on the other hand, has a minimally swelling structure in which the backbone skeleton of the polymer film substrate, the graft molecular chains, and the nano-inorganic particles are mutually crosslinked. Thus, swelling of the membrane with alcohols, including methanol, is scarcely noted. Hence, the crosslinked nano-inorganic particle/polymer electrolyte membrane of the present invention is useful as a membrane for a direct methanol fuel cell, which directly uses methanol as a fuel, without using a reformer.

In the fuel cell, the oxidation resistance of the membrane is a very important characteristic concerned with the durability (life) of the membrane, because OH radicals generated during operation of the cell attack the ion exchange membrane to deteriorate the membrane. A polymer electrolyte membrane, which is obtained by grafting hydrocarbon-based styrene to a polymer film, and then sulfonating the polystyrene graft chains, has very low oxidation resistance. For example, a polystyrene grafted crosslinked electrolyte membrane, which is formed by sulfonating polystyrene chains having a DOG of 45% on a polymer film substrate given a crosslinked structure before introduction of graft molecular chains, undergoes deterioration of the ion exchange membrane after about 20 hours of exposure in a 3% aqueous solution of hydrogen peroxide at 60° C., whereby styrene sulfonate groups as proton conductive groups are detached. This is because the polystyrene chains are easily decomposed by the attack of OH radicals.

The crosslinked nano-inorganic particle/polymer electrolyte membrane of the present invention, on the other hand, has a structure in which the backbone skeleton of the polymer film substrate, the graft molecular chains, and the nano-inorganic particles are mutually crosslinked. Thus, this polymer electrolyte membrane has very high oxidation resistance. For example, even when it is placed in a 3% aqueous solution of hydrogen peroxide at 60° C. for 1,000 hours or more, its ion exchange capacity minimally changes.

Next, preferred embodiments of the method for producing the crosslinked nano-inorganic particle/polymer electrolyte membrane of the present invention will be described.

In a first mode of the method for producing the crosslinked nano-inorganic particle/polymer electrolyte membrane of the present invention, this method comprises: a first ionizing irradiation step of irradiating a polymer film substrate with ionizing radiation to generate radicals, which serve as starting points for graft polymerization, in the backbone skeleton of the polymer film substrate; a graft polymerization step of immersing the polymer film substrate in a solution containing a vinyl monomer and a sol precursor, and graft-polymerizing the vinyl monomer with the polymer film substrate; a sulfonation step of introducing sulfonic groups into graft chains formed in the graft polymerization step; a hydrolysis/heat treatment step of hydrolyzing and heat-treating the sol precursor to form nano-inorganic particles; and a second ionizing irradiation step of irradiating the polymer film substrate with ionizing radiation to mutually crosslink the backbone skeleton of the polymer film substrate, the graft chains, and the sol precursor. Such a mode is also called "the post-graft polymerization method", because a graft polymerization reaction is carried after irradiation with ionizing radiation.

In the method for production according to the present invention, the polymer film substrate is irradiated with ionizing radiation in the first ionizing irradiation step to generate radicals, which serve as starting points for graft polymerization, in the backbone skeleton of the polymer film substrate.

The usable ionizing radiation is γ-rays, electron rays, etc. At room temperature, the polymer film substrate is irradiated with the ionizing radiation to generate radicals. The irradiation dose of the ionizing radiation is preferably 1 to 500 kGy.

The dose rate of the ionizing radiation is preferably 0.1 to 20 kGy/h. The polymer film substrate preferably has oxygen removed before irradiation with the ionizing radiation.

Then, in the method for production according to the present invention, the polymer film substrate is immersed in a solution containing a vinyl monomer and a sol precursor, and the vinyl monomer is graft-polymerized with the polymer film substrate in the graft polymerization step.

As a solvent for dissolving the vinyl monomer and the sol precursor which serves as a raw material for the inorganic material, there can be used dimethyl sulfoxide, dimethylformamide, acetone, and alcohols which are nonaqueous solvents. The solution containing the vinyl monomer and the sol precursor has oxygen removed before the polymer film substrate is immersed therein. Removal of oxygen can be performed by a known method such as freeze deaeration or bubbling with an inert gas.

The concentration of the vinyl monomer in the solution is preferably 30 to 70% by weight.

The concentration of the sol precursor in the solution may be such a concentration that the concentration of the inorganic material in the resulting polymer electrolyte membrane of the present invention is 2 to 15% by weight, preferably 3 to 10% by weight. The concentration of the sol precursor in the solution can be determined, as appropriate, by a person skilled in the art in consideration of the disclosures offered herein.

The graft polymerization is preferably performed for 0.5 to 48 hours at a temperature of 30 to 80° C.

Then, in the method for production according to the present invention, sulfonic groups are introduced, in the sulfonation step, into graft chains formed in the graft polymerization step.

The introduction of the sulfonic groups into the graft chains can be performed by reacting phenyl groups, which are contained in the graft chains, with a dichloroethane solution or chloroform solution of chlorosulfonic acid, or with fuming sulfuric acid.

In the case of the polymer film substrate of the hydrocarbon series having aromatic rings, the introduction of the sulfonic groups by chlorosulfonic acid also sulfonates the substrate itself, depending on the conditions. On the other hand, the [—$SO_2X^1$] groups in the graft chains can be converted to the sulfonic groups [—$SO_3H$] by reacting them in an aqueous solution, a water-alcohol solution or a water-dimethyl sulfoxide solution of potassium hydroxide (KOH) or sodium hydroxide (NaOH) having a concentration of 0.1M to 10M at a temperature of room temperature to 100° C. or lower to form sulfonic salt groups [—$SO_3M$] (where M is an alkali metal, and Na or K), and then treating the sulfonic salt groups in a 1M to 2M sulfuric acid solution at 60° C.

Also, the [—$SO_3R^1$] groups in the graft chains can be converted to sulfonic groups [—$SO_3H$] by reacting them in an acidic solution such as a sulfuric acid solution having a concentration of 0.1M to 10M at room temperature to 100° C. for their hydrolysis, or by hydrolyzing them in a potassium or sodium hydroxide solution having the same concentration.

Furthermore, the halogen groups [—$X^1$] in the graft chains can be converted to sulfonic groups [—$SO_3H$] by reacting them in an aqueous solution, a water-alcohol solution or the like of a sulfite or hydrogen sulfite to form sulfonic salt groups [—$SO_3M$] (where M is an alkali metal, and Na or K), and then treating them in the same manner as described above.

If only the sulfonylvinyl monomer of the group C is used as the vinyl monomer, there is no need to perform the sulfonation step.

Then, in the method for production according to the present invention, the sol precursor is hydrolyzed and heat-treated in the hydrolysis/heat treatment step to form nano-inorganic particles. If tetramethoxysilane "$Si(OCH_3)_4$" is used as the sol precursor, for example, $Si(OCH_3)_4$ is hydrolyzed with water or hydrochloric acid (HCl) incorporated in the polymer film substrate to form tetrahydroxysilane "$Si(OH)_4$", which is then heat-treated to form nano-inorganic particles from the sol precursor. The temperature of the heat treatment is preferably 90 to 150° C.

Then, in the method for production according to the present invention, the polymer film substrate is irradiated in the second irradiation step to mutually crosslink the backbone skeleton of the polymer film substrate, the graft chains, and the nano-inorganic particles.

The usable ionizing radiation is γ-rays, electron rays, etc. At room temperature, the polymer film substrate is irradiated with the ionizing radiation in an inert gas to impart a crosslinked structure. The irradiation dose of the ionizing radiation is preferably 10 to 500 kGy. The dose rate of the ionizing radiation is preferably 0.1 to 20 kGy/h.

In a second mode of the method for producing the crosslinked nano-inorganic particle/polymer electrolyte membrane according to the present invention, the hydrolysis/heat treatment step may be performed after the graft polymerization step, then the second irradiation step may be performed, and the sulfonation step may be further performed.

In a third mode of the method for producing the crosslinked nano-inorganic particle/polymer electrolyte membrane according to the present invention, the second ionizing irradiation step may be performed after the sulfonation step, and then the hydrolysis/heat treatment step may be performed.

In a fourth mode of the method for producing the crosslinked nano-inorganic particle/polymer electrolyte membrane according to the present invention, graft polymerization, hydrolysis/heat treatment, and mutual crosslinking of the backbone skeleton of the polymer film substrate, the graft chains, and the sol precursor may be performed simultaneously with irradiation in the first ionizing irradiation step. Such a mode is also called "the simultaneous irradiation method", because a graft polymerization reaction is performed simultaneously with irradiation with ionizing radiation. In this case, the ionizing radiation is shone in an inert gas at a temperature necessary for the formation of the nano-inorganic particles, preferably 90 to 150° C. Then, in this mode, sulfonic groups are introduced, in the sulfonation step, into the graft chains formed in the graft polymerization step.

The polymer electrolyte membrane produced in accordance with the present invention has a higher DOG (see the equation (1) of the Examples) with the post-graft polymerization method (the first mode of the present invention), as the irradiation dose increases, as the temperature during the graft polymerization reaction rises, or as the grafting time, or has a higher graft rate with the simultaneous irradiation method (the fourth mode of the present invention), as the irradiation dose increases, or as the dose rate of the radiation decreases and the irradiation time.

The inventors have elucidated the characteristics obtained when the crosslinked structure is imparted by irradiation with the ionizing radiation. They are, for example, that by using the film substrate, which has been crosslinked beforehand, the thermal stability of the resulting electrolyte membrane is enhanced, swelling of the membrane is minimal, the DOG of the monomer increases, and a decrease in the strength of the membrane due to irradiation can be curtailed (see T. Yamaki, K. Kobayashi, M. Asano, H. Kubota, and M. Yoshida, Polymer, 45, 6569 (2004)).

The inventors have already found that when crosslinked polytetrafluoroethylene is used as a polymer film substrate, and styrene is used as a graft monomer, with these characteristics being utilized, the DOG can be markedly increased compared with non-crosslinked polytetrafluoroethylene, and sulfonic groups in an amount of 2 to 10 times that for non-crosslinked polytetrafluoroethylene can be introduced into the crosslinked polytetrafluoroethylene (Japanese Unexamined Patent Publication No. 2001-348439). Methods for producing tetrafluoroethylene-propylene hexafluoride copolymer and tetrafluoroethylene-perfluoroalkylvinyl ether copolymer, each having a crosslinked structure, are published in "Radiation Physics Chemistry, 42, 139-142 (1993)", radiation-crosslinked polypropylene is published in "SEI Technical Review, No. 160 (March), 63 (2002)", and polyethylene is published in "Radiation Physics Chemistry, 37, 89 (1991)".

In the method for producing the crosslinked nano-inorganic particle/polymer electrolyte membrane according to the present invention, a mutually crosslinked structure is imparted among the backbone skeleton of the polymer film substrate, the graft chains, and the nano-inorganic particles, whereby a polymer electrolyte membrane having excellent durability and oxidation resistance in comparison with conventional technologies can be produced.

Next, preferred embodiments of a membrane electrode assembly using the crosslinked nano-inorganic particle/polymer electrolyte membrane of the present invention will be described.

The membrane electrode assembly of the present invention is characterized by being composed of the crosslinked nano-inorganic particle/polymer electrolyte membrane, an anode electrode, and a cathode electrode.

The anode electrode and the cathode electrode are not limited, if they are those in ordinary use in the field of the art. For example, carbon paper coated with platinum-ruthenium-carried carbon black as a catalyst can be used as the anode electrode, and carbon paper coated with platinum-carried carbon black as a catalyst can be used as the cathode electrode. The amounts of the carried catalysts of the anode and the cathode can be determined, as appropriate.

The membrane electrode assembly of the present invention can be produced by placing the crosslinked nano-inorganic particle/polymer electrolyte membrane between the anode electrode and the cathode electrode, and joining them by a method usually used in the field of the art, such as hot pressing.

The present invention will be described by Examples and Comparative Example, which in no way limit the invention.

EXAMPLES

1. Production of Crosslinked Nano-Inorganic Particle/Polymer Electrolyte Membrane According to the Present Invention Polymer electrolyte membranes in accordance with the present invention (Examples 1 to 11) were prepared as shown below.

Example 1

A polymer membrane substrate comprising an ethylene-tetrafluoroethylene copolymer (hereinafter referred to as "ETFE membrane") was cut to 3 cm×3 cm, and deaerated in a separable glass container (internal diameter 4 cm, height 15 cm) with a cock, followed by purging the interior of the glass container with an argon gas. In this state, the ETFE membrane was irradiated with γ-rays from a $^{60}Co$ radiation source at a radiation dose of 30 kGy (dose rate 10 kGy/h) at room temperature. Then, 15 ml of a monomer solution containing 40% by weight of a monomer (methylstyrene:t-butylstyrene=50: 50 (wt. %)), 20% by weight of tetramethoxysilane as a sol precursor, and 40% by weight of a solvent (2-propanol:toluene=50:50 (wt. %)), which had been deaerated, was placed in the glass container to immerse the ETFE membrane therein. The glass container was purged with an argon gas, then hermetically sealed, and subjected to graft polymerization for 5 hours, with its temperature being raised from room temperature to 50° C. The resulting graft-polymerized membrane was dried, immersed in 0.2M chlorosulfonic acid diluted with 1,2-dichloroethane, and reacted for 6 hours at 80° C. for sulfonation. Then, the graft membrane was immersed in an aqueous solution of 1M HCl at room temperature to hydrolyze the tetramethoxysilane ($Si(OCH_3)_4$) into $Si(OH)_4$. Then, the hydrolyzate was dried in a vacuum at 1100 for conversion into $SiO_2$ nanoparticles (particle diameter: 30 to 50 nm) by heat treatment.

Example 2

In accordance with the same procedure as in Example 1, the ETFE membrane was rendered ready for use, and irradiated with γ-rays from a $^{60}Co$ radiation source at a radiation dose of 30 kGy (dose rate 10 kGy/h) at room temperature. Then, 15 ml of a monomer solution containing 40% by weight of a monomer (methylstyrene:t-butylstyrene=50:50 (wt. %)), and 60% by weight of a solvent (2-propanol:toluene=50:50 (wt. %)), which had been deaerated, was placed in a glass container to immerse the ETFE membrane therein. The glass container was purged with an argon gas, then hermetically sealed, and subjected to graft polymerization for 5 hours (graft rate: 52%), with its temperature being raised from room temperature to 50° C. The resulting graft membrane was immersed in 0.2M chlorosulfonic acid diluted with 1,2-dichloroethane, and reacted for 6 hours at 8° C. for sulfonation. Then, the sulfonated membrane was washed with water to hydrolyze —$SO_2Cl$ into —$SO_3H$. The resulting sulfonated membrane was dried, then immersed in 15 ml of a 2-propanol solution containing 20% by weight of tetramethoxysilane, further treated for 10 minutes at 80° C., and then dried at the same temperature. The operation of impregnation with tetramethoxysilane as a sol precursor, followed by drying, was repeated several times. The resulting tetramethoxysilane-impregnated membrane was further immersed in an aqueous solution of 1M HCl at room temperature to hydrolyze the tetramethoxysilane ($Si(OCH_3)_4$) into $Si(OH)_4$. Then, the hydrolyzate was dried in a vacuum at 1100 for conversion into $SiO_2$ nanoparticles (particle diameter: 30 to 50 nm) (filler factor of nano-inorganic particles: 8%).

Example 3

In accordance with the same procedure as in Example 1, the ETFE membrane was prepared to obtain a graft-polymerized membrane. This graft-polymerized membrane was dried, and then immersed in an aqueous solution of 1M HCl at room temperature to hydrolyze tetramethoxysilane ($Si(OCH_3)_4$) into $Si(OH)_4$. Then, the hydrolyzate was dried in a vacuum at 1100 for conversion into $SiO_2$ nanoparticles (particle diameter: 30 to 50 nm). The nano-inorganic particle composite graft membrane was irradiated with 200 kGy of γ-rays (dose rate 10 kGy/h) at room temperature in an argon atmosphere to impart a crosslinked structure. Further, the resulting nano-inorganic particle composite crosslinked graft membrane was immersed in 0.2M chlorosulfonic acid diluted with 1,2-dichloroethane, and reacted for 6 hours at 80° C. for sulfonation. Then, the sulfonated membrane washed with water to hydrolyze —SO$_2$Cl into —SO$_3$H.

Example 4

A crosslinked nano-inorganic particle/polymer electrolyte membrane obtained in accordance with the same procedure as in Example 2 was irradiated with 200 kGy of electron rays at room temperature in a nitrogen atmosphere to impart a crosslinked structure.

Example 5

A chlorosulfonic acid-impregnated membrane before hydrolysis was obtained in accordance with the same procedure as in Example 2. To impart a crosslinked structure to this membrane, the membrane was irradiated with 200 kGy of electron rays at room temperature in a nitrogen atmosphere. The resulting crosslinked chlorosulfonic acid-impregnated membrane washed with water to hydrolyze —SO$_2$Cl into —SO$_3$H. The hydrolyzate was immersed in 15 ml of a 2-propanol solution containing 20% by weight of tetramethoxysilane, further held at 80° C. for 10 minutes, and then dried at the same temperature. The operation of impregnation with tetramethoxysilane as a sol precursor, followed by drying, was repeated several times. The resulting tetramethoxysilane-impregnated membrane was further immersed in an aqueous solution of 1M HCl at room temperature to hydrolyze the tetramethoxysilane (Si(OCH$_3$)$_4$) into Si(OH)$_4$. Then, the hydrolyzate was dried in a vacuum at 1100 for conversion into SiO$_2$ nanoparticles (particle diameter: 30 to 50 nm).

Example 6

A crosslinked nano-inorganic particle/polymer electrolyte membrane was obtained in accordance with the same procedure as in Example 3, except that 1,2,2-trifluoroethylenesulfonyl fluoride (CF$_2$=CF—SO$_2$F) and 2-fluorostyrene were further added to methylstyrene and t-butylstyrene as the monomer (molar ratio=1:1:1:1).

Example 7

A crosslinked nano-inorganic particle/polymer electrolyte membrane was obtained in accordance with the same procedure as in Example 3, except that a membrane comprising polyvinylidene fluoride was used as the polymer film substrate.

Example 8

A crosslinked nano-inorganic particle/polymer electrolyte membrane was obtained in accordance with the same procedure as in Example 3, except that a membrane comprising polyethylene was used as the polymer film substrate.

Example 9

A crosslinked nano-inorganic particle/polymer electrolyte membrane was obtained in accordance with the same procedure as in Example 3, except that to methylstyrene and t-butylstyrene bis(vinylphenyl)ethane and divinylbenzene were further added as the monomer (weight ratio=40:40:17.5:2.5).

Example 10

A crosslinked nano-inorganic particle/polymer electrolyte membrane was obtained in accordance with the same procedure as in Example 3, except that monophenylmethoxysilane was used as the sol precursor.

2. Characteristics of Crosslinked Nano-Inorganic Particle/Polymer Electrolyte Membrane According to the Present Invention The characteristics of the polymer electrolyte membranes according to the present invention (Examples 1 to 11) were measured by the methods shown below. The results are shown in Table 1.

(1) Graft Rate (wt. %)

Let the polymer film substrate before graft polymerization be a main chain portion, and a portion graft-polymerized with the polymer film substrate, such as a fluoromonomer or a hydrocarbon-based monomer, be a graft chain portion. Then, the weight ratio of the graft chain portion to the main chain portion is expressed as a DOG ($X_{dg}$ [wt. %]) in the following equation:

$$X_{dg}=100(W_2-W_1)/W_1$$

$W_1$: Dry weight (g) of polymer film substrate before graft polymerization $W_2$: Dry weight (g) of polymer film substrate after graft polymerization (2) Ion exchange capacity (meq/g)

The ion exchange capacity (IEC) of the polymer electrolyte membrane produced is represented by the following equation:

$$IEC=[n(acid)_{obs}]/W_d$$

[n (acid)$_{obs}$]: Amount (mmol) of acid groups of electrolyte membrane $W_d$: Dry weight (g) of ion exchange membrane Measurement of [n (acid)$_{obs}$] was made after the sulfonic groups as the ion exchange groups were rendered a completely acidic type (H-type) for maximum accuracy. Concretely, the resulting electrolyte membrane was immersed again in a 1M sulfuric acid solution for 4 hours at 50° C. to become a completely acidic type (H-type), and then immersed in an aqueous solution of 3M NaCl for 4 hours at 50° C. to convert it to —SO$_3$Na type. The substituted protons (H+) were neutralized and titrated with 0.2M NaOH to determine the acid radical concentration. The dry weight of the ion exchange membrane is the weight obtained after drying the H-type polymer electrolyte membrane in a vacuum at 60° C.

(3) Water Content (%)

The H-type electrolyte membrane preserved in water at room temperature was withdrawn from water, and water was lightly wiped off. Then (after 1 minute later), the weight of the electrolyte membrane was measured and designated as $W_s$ (g). Then, this membrane was dried under vacuum for 16 hours at 60° C., and then its dry weight was measured and designated as $W_d$ (g). The water content is calculated from the following equation:

$$\text{Water content (\%)}=100\times(W_s-W_d)/W_d$$

(4) Proton Conductivity ($\Omega^{-1}$ cm$^{-1}$)

The proton conductivity (specific conductance) of the polymer electrolyte membrane was calculated from the following equation:

$$\kappa=d/(R_m\cdot S)$$

$\kappa$: Proton conductivity ($\Omega^{-1}$ cm$^{-1}$) of membrane d: Thickness (cm) of electrolyte membrane $R_m$: Membrane resistance ($\Omega$)

S: Current passage area (cm$^2$) of electrolyte membrane

The membrane resistance ($R_m$) was determined in accordance with measurement by the alternating current method (Shin Jikken Kagaku Koza (New Courses on Experimental Chemistry) 19, Kobunshi Kagaku (Polymer Chemistry)<II>, p. 992, Maruzen Co., Ltd.) in which a customary membrane resistance measuring cell and Hewlett-Packard's LCR meter (E-4925A) were used, an aqueous solution of 1M sulfuric acid was charged into the cell, and resistance between platinum electrodes (distance: 5 mm) was measured in the presence and absence of the membrane).

For comparison of the measured values of the proton conductivity, measurements were also made by the direct current method using a cell, a potentiostat, and a function generator similar to those disclosed in Mark W. Verbrugge, Robert F. Hill et al. (J. Electrochem. Soc., 137 (1990) 3770-3777). A good correlation was observed between the measured values of the alternating current method and the direct current method. The values in Table 1 below show the measured values by the alternating current method.

(5) Oxidation Resistance (Proton Conductive Group Elimination Time)

The polymer electrolyte membrane was saturated with and swollen in an aqueous solution at 60° C., and then immersed in a 3% aqueous solution of hydrogen peroxide at 60° C. Based on the time of saturation and swelling, a measurement was made of the period from the start of immersion until the weight of the electrolyte membrane began to decrease (this period: conductive group elimination time). The conductive group elimination time was taken as an indicator of oxidation resistance.

(6) Degree of Length Swelling (%)

In connection with a sulfonic acid type (—SO$_3$H type) membrane, the length of one side thereof in a wetted state caused by impregnation with water at room temperature was designated as $L_O$. This membrane was immersed in a 10 mol/L methanol solution at room temperature, and the length of the same one side thereof in a methanol solution-wetted state at room temperature was designated as $L_M$. The degree of length swelling is calculated from the following equation:

Degree of length swelling (%)=100×($L_M$/$L_O$)

(7) Tensile Strength (MPa)

The tensile strength of the electrolyte membrane was measured in a tension test conducted in accordance with ASTM D882. The tension test was performed by an Orientec STA-1150A tester at a speed of 20 mm/min at room temperature with the use of a cut-out specimen of the electrolyte membrane.

(8) Permeability to Methanol (10$^{-6}$ cm/s)

The methanol permeability of the electrolyte membrane was evaluated by the following procedure: First, the electrolyte membrane was set, as a diaphragm, between a chamber A and a chamber B of an H-type glass cell. The chamber A of the glass cell was charged with 100 ml of a 10M methanol solution, and the chamber B was charged with 100 ml of purified water. The cell in this state was installed in a dryer controlled to 80° C., and the respective solutions were stirred at a constant speed using stirrers in the chamber A and the chamber B. The solution in the chamber B was sampled at predetermined time intervals, and the methanol concentration (M) was measured using a methanol concentration meter to evaluate the methanol permeability of the electrolyte membrane. Methanol permeability coefficient P (cm/s) was calculated from the following equation:

$$P = \frac{V \times d}{(M_{MeOH} - M_{H_2O}) \times S} \times \frac{dM_{H_2O}}{dt}$$

V: Volume (100 cm$^3$) of solution
d: Thickness (cm) of electrolyte membrane
S: Area (cm$^2$) of contact between electrolyte membrane and solution
$M_{MeOH}$: Methanol concentration (M) in chamber A at time t
$M_{H_2O}$: Methanol concentration (M) in chamber B at time t

TABLE 1

|  | Ion exchange capacity (meq/g) | Proton conductivity ([Ω · cm]$^{-1}$) | Water content (%) | Oxidation resistance (hrs) | Degree of swelling (%) | Tensile strength (MPa) | Methanol permeability (10$^{-6}$ cm$^2$/sec) |
|---|---|---|---|---|---|---|---|
| Ex. 1 | 2.2 | 0.064 | 31 | 350 | 112 | 28 | 1.1 |
| Ex. 2 | 1.9 | 0.061 | 35 | 371 | 108 | 32 | 0.8 |
| Ex. 3 | 2.0 | 0.060 | 28 | 580 | 105 | 38 | 0.5 |
| Ex. 4 | 1.6 | 0.059 | 32 | 153 | 111 | 16 | 1.6 |
| Ex. 5 | 1.5 | 0.057 | 33 | 148 | 113 | 14 | 1.7 |
| Ex. 6 | 0.9 | 0.038 | 20 | 639 | 103 | 39 | 0.5 |
| Ex. 7 | 1.5 | 0.055 | 28 | 430 | 105 | 23 | 0.8 |
| Ex. 8 | 2.6 | 0.085 | 45 | 390 | 115 | 20 | 0.3 |
| Ex. 9 | 2.3 | 0.062 | 23 | 670 | 104 | 40 | 0.4 |
| Ex. 10 | 2.1 | 0.061 | 27 | 584 | 105 | 39 | 0.6 |

3. Cell Performance of Polymer Electrolyte Fuel Cell Using Crosslinked Nano-Inorganic Particle/Polymer Electrolyte Membrane of the Present Invention Example 11

A single cell of a polymer electrolyte fuel cell was prepared using the crosslinked nano-inorganic particle/polymer electrolyte membrane obtained in Example 9, and its cell performances were evaluated.

Platinum-ruthenium(Pt:Ru=2:1, molar ratio)-carried carbon black was used as an anode catalyst, and platinum-carried carbon black was used as a cathode catalyst. These catalysts were each formed into a paste with the use of a Nafion (DuPont) solution as a binder, and the paste was coated onto a carbon paper (TGP-H-060, thickness: 200 μm, TORAY INDUSTRIES, INC.) having a primer coating of polytetrafluoroethylene-carbon to form catalyst layers. The amount of the catalyst carried on the anode side was 3 mg/cm$^2$, and the amount of the catalyst carried on the cathode side was 2 mg/cm$^2$. The crosslinked nano-inorganic particle/polymer electrolyte membrane was placed between the above anode electrode and cathode electrode, and this combination was hot-pressed for 3 minutes at a temperature of 180° C. and a pressure of 2 MPa to prepare a single polymer electrolyte fuel cell consisting of a membrane electrode assembly.

The characteristics evaluation of a direct methanol fuel cell was performed by measuring current density and cell voltage at an anode methanol concentration of 5 mol/L, a methanol utilization factor of 35%, a dry air (as a cathode gas) utilization factor of 25%, and a cell temperature of 75° C. using an evaluation cell of Electrochem (electrode area: 25 cm$^2$), and calculating output density from the product of the two parameters. The results found were a current density at 0.4V of 0.16 A/cm$^2$, and a maximum output density of 80 mW/cm$^2$.

Comparative Example

For comparison, a fuel cell was prepared in accordance with the same procedure as that in Example 11, except for the use of Nafion 117 (DuPont), and its cell performances were evaluated under the same conditions. The results found were a current density at 0.4V of 0.07 A/cm$^2$, and a maximum output density of 35 mW/cm$^2$. These findings confirmed the excellent cell performances of the crosslinked nano-inorganic particle/polymer electrolyte membrane according to the present invention.

As described above, the crosslinked nano-inorganic particle/polymer electrolyte membrane according to the present invention has excellent oxidation resistance, proton conductivity, and dimensional stability, and can control ion exchange capacity within a broad range. Thus, it is useful as an electrolyte membrane for a polymer electrolyte fuel cell which can be used at a high temperature of 80° C. or above. It is also useful as an inexpensive and durable electrolytic membrane and an ion exchange membrane.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crosslinked nano-inorganic particle/polymer electrolyte membrane comprising:
   a polymer film substrate having a backbone skeleton;
   graft molecular chains bound to the backbone skeleton of the polymer film substrate and comprising graft-polymerized vinyl monomers;
   sulfonic groups bound to the graft molecular chains; and
   inorganic nano-scale particles, wherein
   the backbone skeleton of the polymer film substrate, the graft molecular chains, and the inorganic nano-scale particles mutually crosslink to form a crosslinked structure, the inorganic nano-scale particles being uniformly dispersed within the crosslinked structure.

2. The crosslinked nano-inorganic particle/polymer electrolyte membrane according to claim 1, wherein the polymer film substrate is a fluorocarbon-based polymer film substrate, a fluorocarbon-hydrocarbon-based polymer film substrate, or a hydrocarbon-based polymer film substrate.

3. A membrane electrode assembly composed of the crosslinked nano-inorganic particle/polymer electrolyte membrane according to claim 1, an anode electrode, and a cathode electrode.

* * * * *

UNITED STATES PATENT AND TRADEMARK OFFICE
CERTIFICATE OF CORRECTION

PATENT NO. : 8,129,074 B2  
APPLICATION NO. : 11/600279  
DATED : March 6, 2012  
INVENTOR(S) : Jinhua Chen et al.

Page 1 of 1

It is certified that error appears in the above-identified patent and that said Letters Patent is hereby corrected as shown below:

On the Title Page

Item (56) (Foreign Patent Documents), Line 18, Delete "1005-56787" and insert -- 2005-56787 --, therefor.

Signed and Sealed this  
Fourth Day of September, 2012

David J. Kappos  
*Director of the United States Patent and Trademark Office*